US009152437B2

(12) United States Patent
Spencer et al.

(10) Patent No.: US 9,152,437 B2
(45) Date of Patent: Oct. 6, 2015

(54) DYNAMICALLY INSTALLING IMAGE PROCESSING (75) Inventors: Andrew M. Spencer, Eagle, ID (US); Randall Edward Grohs, Star, ID (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 856 days.

(21) Appl. No.: 12/914,380

(22) Filed: Oct. 28, 2010

(65) Prior Publication Data

US 2012/0110601 A1    May 3, 2012

(51) Int. Cl.
*G06F 3/12* (2006.01)
*G06F 9/445* (2006.01)
*G06F 9/455* (2006.01)

(52) U.S. Cl.
CPC ............ *G06F 9/445* (2013.01); *G06F 9/45504* (2013.01)

(58) Field of Classification Search
None
See application file for complete search history.

(56) References Cited

U.S. PATENT DOCUMENTS

| | | | | |
|---|---|---|---|---|
| 6,011,916 A * | 1/2000 | Moore et al. | 717/104 |
| 6,031,623 A * | 2/2000 | Smith et al. | 358/1.14 |
| 6,072,953 A * | 6/2000 | Cohen et al. | 717/166 |
| 6,081,665 A * | 6/2000 | Nilsen et al. | 717/116 |
| 6,093,216 A * | 7/2000 | Adl-Tabatabai et al. | 717/128 |
| 6,151,618 A * | 11/2000 | Wahbe et al. | 718/1 |
| 6,233,733 B1 * | 5/2001 | Ghosh | 717/118 |
| 6,256,752 B1 * | 7/2001 | Blandy et al. | 714/38.1 |
| 6,289,506 B1 * | 9/2001 | Kwong et al. | 717/148 |
| 6,292,935 B1 * | 9/2001 | Lueh et al. | 717/148 |
| 6,295,642 B1 * | 9/2001 | Blandy | 717/148 |
| 6,314,558 B1 * | 11/2001 | Angel et al. | 717/118 |
| 6,317,869 B1 * | 11/2001 | Adl-Tabatabai et al. | 717/132 |
| 6,463,521 B1 * | 10/2002 | Long | 712/213 |
| 6,625,805 B1 * | 9/2003 | Lam et al. | 717/130 |
| 6,628,413 B1 * | 9/2003 | Lee | 358/1.15 |
| 6,704,926 B1 * | 3/2004 | Blandy et al. | 717/148 |
| 6,914,694 B1 * | 7/2005 | Ichikawa et al. | 358/1.15 |
| 7,016,061 B1 * | 3/2006 | Hewitt | 358/1.15 |
| 7,146,413 B2 * | 12/2006 | Spitzer et al. | 709/220 |
| 7,146,613 B2 * | 12/2006 | Chauvel et al. | 718/1 |
| 7,171,655 B2 * | 1/2007 | Gordon et al. | 717/146 |
| 7,274,477 B2 | 9/2007 | Reese et al. | |
| 7,546,576 B2 * | 6/2009 | Egli | 717/106 |
| 7,587,712 B2 * | 9/2009 | Mountain et al. | 717/148 |
| 7,657,656 B2 * | 2/2010 | Pessi | 709/247 |
| 7,665,075 B1 * | 2/2010 | Daynes et al. | 717/148 |
| 7,707,557 B1 * | 4/2010 | Nikolov | 717/130 |
| 7,779,389 B2 * | 8/2010 | Markov et al. | 717/121 |
| 7,849,452 B2 * | 12/2010 | Holt | 717/159 |
| 8,082,542 B2 * | 12/2011 | Bottomley et al. | 717/148 |
| 8,239,861 B2 * | 8/2012 | Swart et al. | 718/1 |
| 8,327,342 B2 * | 12/2012 | Komatsu et al. | 717/145 |
| 8,477,994 B1 * | 7/2013 | Noshadi | 382/103 |
| 2002/0057454 A1 * | 5/2002 | Ueda et al. | 358/1.15 |
| 2002/0140966 A1 * | 10/2002 | Meade et al. | 358/1.15 |

(Continued)

*Primary Examiner* — Ted Barnes
(74) *Attorney, Agent, or Firm* — Brooks, Cameron, Huebsch, PLLC (57) ABSTRACT

Methods, computer-readable media, and systems are provided for dynamically installing an image processing filter. One method for dynamically installing an image processing filter includes starting to obtain image information by infrastructure of an image processing device and processing the obtained image information with an application. After starting to obtain image information, receiving an operating system (OS) application programming interface (API) allowing just-in-time (JIT) bytecode to be executed as a filter during processing the obtained image information.

13 Claims, 5 Drawing Sheets

(56) References Cited

U.S. PATENT DOCUMENTS

| | | | |
|---|---|---|---|
| 2003/0035144 A1* | 2/2003 | Shima | 358/1.18 |
| 2003/0076521 A1* | 4/2003 | Li et al. | 358/1.13 |
| 2003/0084271 A1* | 5/2003 | Lindwer | 712/209 |
| 2003/0101208 A1* | 5/2003 | Chauvel et al. | 709/1 |
| 2004/0015916 A1* | 1/2004 | Click et al. | 717/150 |
| 2004/0223175 A1* | 11/2004 | Lee | 358/1.13 |
| 2004/0225747 A1* | 11/2004 | Kadi | 709/232 |
| 2004/0230950 A1* | 11/2004 | Bedner et al. | 717/118 |
| 2004/0246516 A1* | 12/2004 | Reese et al. | 358/1.15 |
| 2005/0002056 A1* | 1/2005 | Lee | 358/1.15 |
| 2005/0036166 A1* | 2/2005 | Williams et al. | 358/1.15 |
| 2005/0063575 A1* | 3/2005 | Ma et al. | 382/128 |
| 2005/0088685 A1* | 4/2005 | Lee | 358/1.15 |
| 2005/0091671 A1* | 4/2005 | Deem et al. | 719/328 |
| 2005/0100211 A1* | 5/2005 | Gibson et al. | 382/162 |
| 2005/0132363 A1* | 6/2005 | Tewari et al. | 718/1 |
| 2005/0146735 A1* | 7/2005 | Ternasky et al. | 358/1.9 |
| 2005/0188382 A1* | 8/2005 | Nagendra et al. | 719/328 |
| 2005/0243364 A1* | 11/2005 | Sakai | 358/1.15 |
| 2005/0289156 A1* | 12/2005 | Maryka et al. | 707/100 |
| 2006/0070044 A1* | 3/2006 | Romanovski et al. | 717/136 |
| 2006/0070049 A1* | 3/2006 | Chung | 717/148 |
| 2006/0179058 A1* | 8/2006 | Bram et al. | 707/9 |
| 2006/0253847 A1* | 11/2006 | Romanovskiy | 717/153 |
| 2006/0262350 A1* | 11/2006 | Lee | 358/1.15 |
| 2007/0061791 A1* | 3/2007 | Hartikainen | 717/148 |
| 2007/0157185 A1* | 7/2007 | Semerdzhiev et al. | 717/148 |
| 2007/0226716 A1* | 9/2007 | Chen | 717/148 |
| 2007/0240124 A1* | 10/2007 | Taneda et al. | 717/129 |
| 2007/0250825 A1* | 10/2007 | Hicks et al. | 717/151 |
| 2007/0271283 A1* | 11/2007 | Maryka et al. | 707/100 |
| 2007/0288912 A1* | 12/2007 | Zimmer et al. | 717/148 |
| 2008/0117450 A1* | 5/2008 | Claiborne et al. | 358/1.15 |
| 2008/0141246 A1* | 6/2008 | Kuck et al. | 718/1 |
| 2009/0037891 A1* | 2/2009 | Wang | 717/148 |
| 2009/0119417 A1* | 5/2009 | Dowling | 709/249 |
| 2009/0150873 A1* | 6/2009 | Taneda | 717/148 |
| 2009/0180133 A1* | 7/2009 | Yamamoto | 358/1.13 |
| 2009/0204963 A1* | 8/2009 | Swart et al. | 718/1 |
| 2009/0228955 A1* | 9/2009 | Gibson et al. | 726/1 |
| 2009/0249313 A1* | 10/2009 | Sobel et al. | 717/140 |
| 2009/0288077 A1* | 11/2009 | Miranda-Steiner et al. | 717/173 |
| 2010/0095284 A1* | 4/2010 | Herring et al. | 717/148 |
| 2010/0208302 A1* | 8/2010 | Lee | 358/1.15 |
| 2010/0235819 A1* | 9/2010 | Rose | 717/139 |
| 2010/0318978 A1* | 12/2010 | Nikolov et al. | 717/148 |
| 2011/0023019 A1* | 1/2011 | Aniszczyk et al. | 717/128 |
| 2011/0035735 A1* | 2/2011 | Kramp et al. | 717/148 |
| 2011/0148895 A1* | 6/2011 | Burckart et al. | 345/557 |
| 2011/0205574 A1* | 8/2011 | Lee | 358/1.14 |
| 2011/0242554 A1* | 10/2011 | Farry et al. | 358/1.6 |
| 2013/0167136 A1* | 6/2013 | Goldman | 717/175 |

* cited by examiner

DYNAMICALLY INSTALLING IMAGE PROCESSING

BACKGROUND

As printing technology has progressed, printing and imaging devices (Scanners, Single Function Printers and Multifunction Printers) have included or been adapted to include and increasing number of functions. Some previous approaches to increasing the functionality of printing and imaging devices have included embedding the functionality (e.g., image filters) on the devices or installing additional functionality that can be recognized at boot time of the devices as a permanent solution when embedded functionality does not meet a particular goal.

DETAILED DESCRIPTION

Methods, computer-readable media, and systems are provided for dynamically installing image processing. One method for dynamically installing image processing includes starting to obtain image information by infrastructure of an image processing device and processing the obtained image information with an application. After starting to obtain image information, receiving an operating system (OS) application programming interface (API) allowing just-in-time (JIT) bytecode to be executed as a filter during processing the obtained image information.

As printing technology has progressed, more printing and imaging devices (Scanners, Single Function Printers and Multifunction Printers) are utilizing operating systems that support "just-in-time" compilation. Through the use of just in time compilation techniques, the following disclosure describes a system and methods whereby a document workflow application that integrates imaging and printing devices can distribute scan or print transformation processing functions (e.g., filters) via a web service and then configure the filters operation via a web service to facilitate distributed processing and off loading the application server of these functions.

As used herein an image processing device can include a scanner, a printer, and a multifunction device that includes scanning and printing functionality. Such a device may also have additional functionality, such as faxing. An image as used herein is intended to mean a two-dimensional representation, such as a scanned picture, and/or a printed output such a document. Image, as used herein, includes printed documents assembled from characters and formatting commands, as well as those based on specified vectors and/or pixel values.

As used herein image information includes image data and image metadata. Image data is that data directly defining the image, and image metadata provides additional details concerning the image defined by the image data. Image metadata can include, for example, parameters about the image including format, density, size, and pages, among others.

The figures attempt to follow a numbering convention in which the first digit or digits correspond to the drawing figure number and the remaining digits identify an element or component in the drawing. Similar elements or components between different figures may be identified by the use of similar digits. For example, 116 may reference element "16" in FIG. 1, and a similar element may be referenced as 216 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Figure 1:
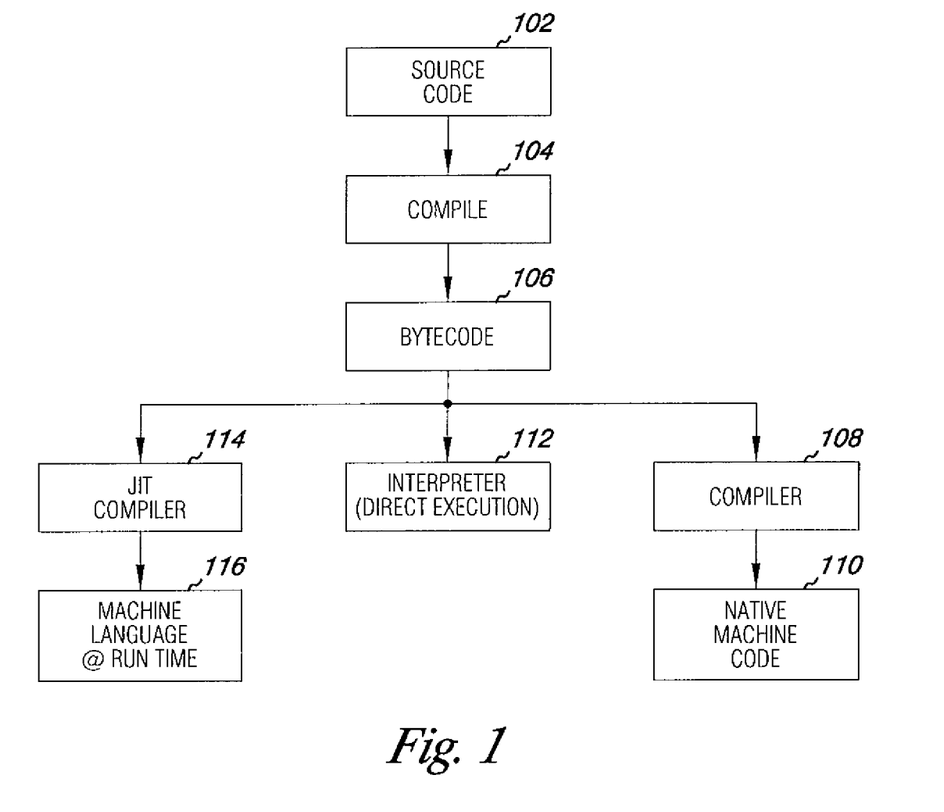
FIG. 1 is a block diagram illustrating bytecode according to one or more embodiments of the present disclosure.

FIG. 1 is a block diagram illustrating bytecode according to one or more embodiments of the present disclosure. Bytecode is a term which has been used to denote various forms of instruction sets designed for efficient execution by an interpreter, as well as being suitable for further compilation into machine code. The name bytecode stems from instruction sets which typically have one-byte opcodes followed by optional parameters. Unlike human-readable source code, bytecodes are compact numeric codes, constants, and references, such as numeric addresses, which encode the result of parsing and semantic analysis of things like type, scope, and nesting depths of program objects.

FIG. 1 shows source code 102 compiled at 104 into bytecode 106. Bytecode may be either directly executed on a virtual machine (e.g., an interpreter 112), or it may be further compiled (e.g., statically ahead of time) by a compiler 108 into native machine code 110 for better performance. Interpreted code can be translated from a high-level language to a machine code continuously during every execution, whereas statically compiled code is translated into machine code before execution, and only requires such translation once. Therefore, bytecode can allow much better performance than direct interpretation of the source code 102.

Bytecode may also be dynamically translated (e.g., compiled by a "just-in-time" (JIT) compiler 114) into machine language 116 at runtime, again providing better performance than direct interpretation of the source code 102. JIT compilers represent a hybrid approach with translation occurring continuously, as with interpreters, but with caching of translated code to minimize performance degradation. JIT compilation also offers other advantages over statically compiled code at development time, such as handling of late-bound data types and the ability to enforce security guarantees. JIT compilation converts code at runtime prior to executing it natively. Several modern runtime environments, such as Microsoft's .NET Framework and most implementations of Java, rely on JIT compilation for high-speed code execution.

Intermediate representations such as bytecode may be output by programming language implementations to ease interpretation. Bytecode may be executed by parsing and directly executing the instructions, one at a time. This kind of bytecode interpreter is very portable. Dynamic translators, or JIT compilers, translate bytecode into machine language as necessary at runtime. For example, some functionalities are stored in bytecode format that is JET compiled to translate the bytecode to machine code just before execution thereof. This JIT compilation introduces a delay before the machine code can be run, but improves execution speed considerably compared to direct interpretation of the source code—normally by a factor of several times.

However, JIT compilation can make the virtual machine unportable (without losing the portability of the bytecode itself). Because of its performance advantage, today many different language implementations execute a program in two phases, first compiling the source code into bytecode, and then passing the bytecode to the virtual machine. As such bytecode may be used to reduce hardware and operating system dependence since the same bytecode can be run on different platforms. Different parts of code may often be stored in separate files, similar to object modules, which are dynamically loaded during execution.

Figure 2A:
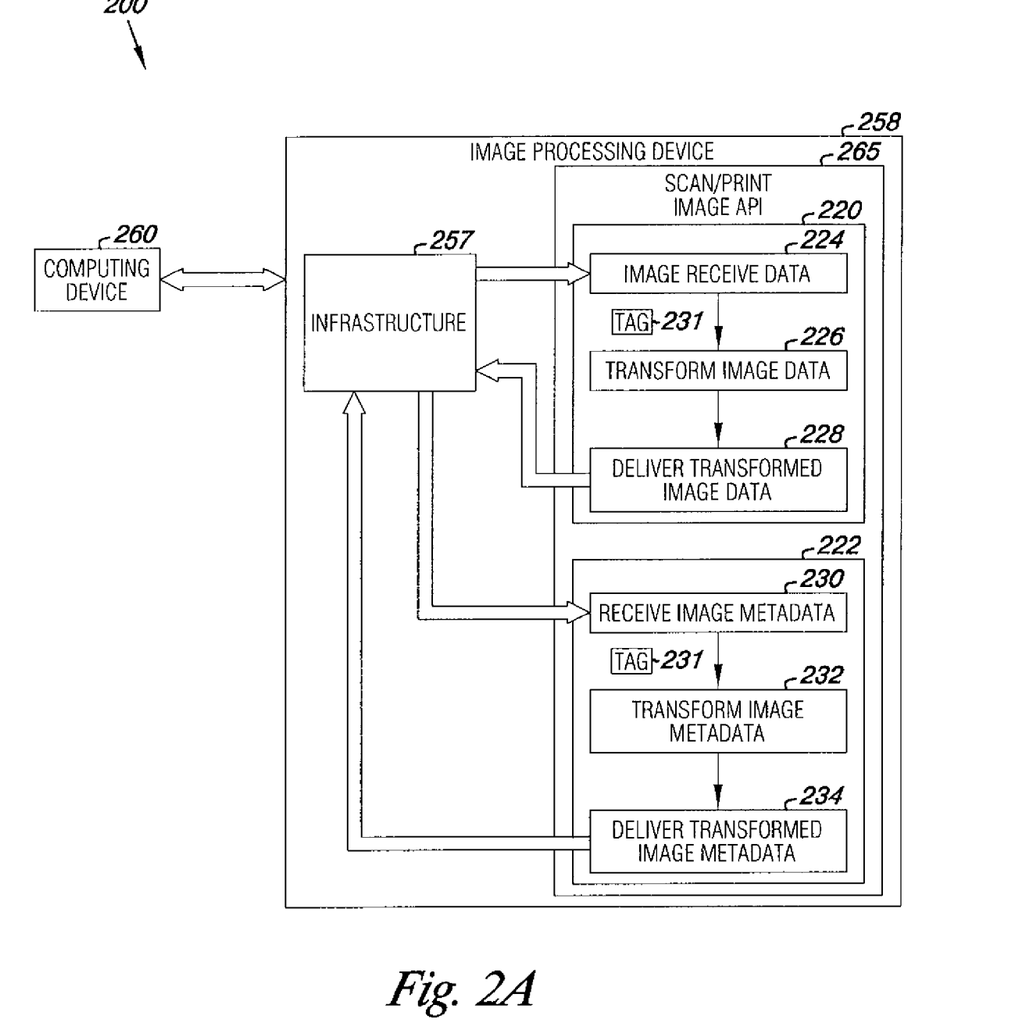
FIG. 2A is a block diagram chart illustrating an image processing device application programming interface (API) according to one or more embodiments of the present disclosure.

FIG. 2A is a block diagram chart illustrating an image processing device application programming interface (API) according to one or more embodiments of the present disclosure. According to some embodiments of the present disclosure, a computing system 200 allows a workflow application, such as may be used in an image processing device (e.g., scanner, printer, multifunction device including image scanning and printing functionality), to dynamically install image processing (e.g., scanning, print processing) functions on the imaging processing device at the time of use. Dynamically installed image processing functionality can allow an image processing application to balance processing load (e.g., transformation processing load) between the image processing device and another computing device (e.g., server).

Dynamically installing image processing functions on the imaging processing device at the time of use can also enable customizing the processing for each image processing device dependent on the workflow requirements that the device is presently executing. Some previous approaches involve embedding image filters in the image processing device before processing a particular image (e.g., scanned image, print job). For example, image processing for a scanned image may include a particular implementation of optical character recognition (OCR). However, image filters embedded in the image processing device before processing of a particular image might not be useful or used if the processing of the embedded filter is not required for the invoked image processing, or did not meet the present image processing need(s) due to lack of functionality or features of the embedded image filter.

Some previous approaches install one or more additional filters as a permanent solution when an existing embedded filter did not meet the requirement for a particular image processing task. Again, the additional filter is installed prior to the initiation of processing a subsequent particular image. Such additional filters employed by previous approaches were not based on JIT operating system (OS) technologies. Therefore, the additional filter of previous approaches would have to be recognized at boot time. As such, the additional filter could not be dynamically changed based on present need of an application during image processing.

According to one or more embodiments of the present disclosure, and as shown in FIG. 2A, a system 200 for dynamically installing image processing (e.g., a filter) on an image processing device 258 (e.g., a peripheral device) can be implemented via a scan/print image API, which can be comprised of a set of device OS APIs that allow a JIT code (e.g., JIT bytecode) to be run that plug in as a filter within an image processing process.

Image processing device 258 can be communicatively coupled to a computing device 260. Image processing device 258 can include infrastructure 257, which can be communicatively coupled to a scan/print image API 265. Infrastructure 257 is intended to connote the image processing apparatus, such as the image input hardware (e.g., scanner equipment) and/or image output hardware (printing equipment). The scan/print image API 265 can include an image data portion 220 and an image metadata portion 222 downloaded onto the image processing device 258.

The JIT bytecode can operate as a filter inserted in an image processing (e.g., imaging, printing) pipeline to: receive a scanned image or print data from the image processing device infrastructure 224 (e.g., scanning equipment, printing equipment); transform the scanned image or print data 226; and deliver the transformed image 228 (e.g., back to the infrastructure and/or to a next step in the image processing process). For example, a scanned image from the infrastructure of an image processing device can be transformed before being sent on for delivery or production (e.g., output). In another example, print data can be transformed prior to printing.

The JIT bytecode can also operate as a filter inserted in the image processing pipeline to: receive scanned image metadata or print data metadata from the image processing device infrastructure for transformation 230; transform the metadata 232; and deliver the transformed metadata downstream in the print system or before scan image delivery 234.

Figure 2B:
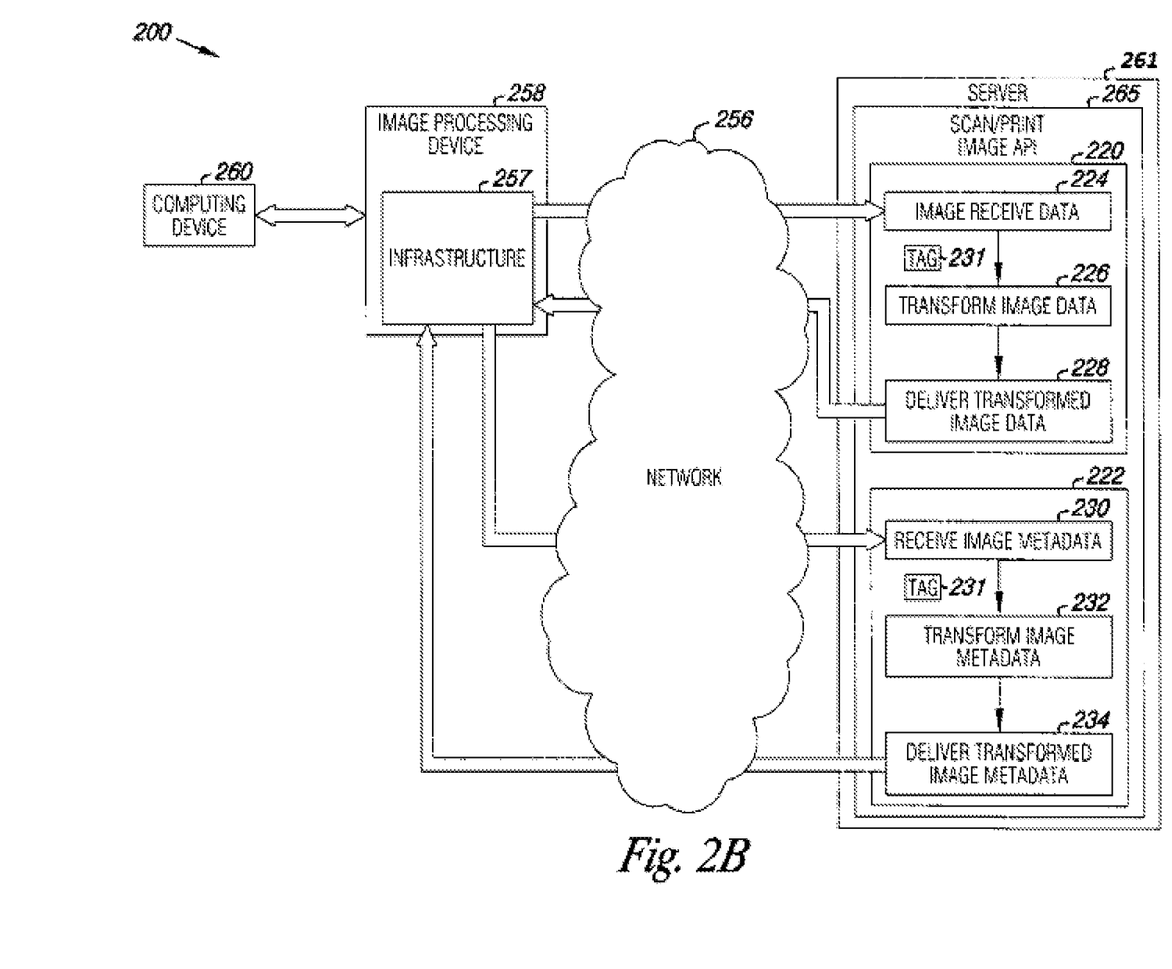
FIG. 2B is a block diagram chart illustrating a web service API according to one or more embodiments of the present disclosure.

FIG. 2B is a block diagram chart illustrating a web service API according to one or more embodiments of the present disclosure. According to one or more embodiments, a set of APIs that provide the above-described functionality can be implemented on a server (e.g., in addition to or in lieu of APIs installed on the image processing device) to configure a server client application to use the identical JIT bytecode.

FIG. 2B shows image processing device 258 being communicatively coupled to computing device 260. Image processing device 258 includes infrastructure 257, which can be communicatively coupled to a scan/print image API 265. However, scan/print image API 265 resides on server 261 rather than on the image processing device as shown in FIG. 2A. Infrastructure 257 can be communicatively coupled to a scan/print image API 265 via a network 256, such as the Internet.

The scan/print image API 265 can include an image data portion 220 and an image metadata portion 222, each of which includes JIT bytecode as described with respect to FIG. 2A.

For example, some software frameworks (e.g., a .NET framework) can be installed on computing devices running particular operating systems. These frameworks can include a large library of coded solutions to common programming problems and a common language infrastructure that manages the execution of programs written specifically for the framework. Some frameworks support multiple programming languages. A class library associated with the framework can provide a large range of features including user interface, data access, database connectivity, cryptography, web application development, numeric algorithms, and network communications. The class library is used by programmers, who can combine it with their own code to produce applications.

Programs written for a particular framework can execute in an environment that manages the program's runtime requirements. A Common Language Runtime (CLR) can provide the appearance of an application virtual machine so that programmers need not consider the capabilities of the specific CPU that will execute the program. The CLR also can provide other important services such as security, memory management, and exception handling. The class library and the CLR together can constitute a framework, such as the .NET Framework.

A .Net cs file is one example of JIT bytecode. The .cs files are source code files created in a particular C-style programming language that is type-safe and object-oriented, and designed for building a variety of applications that run on the .NET Framework, including XML Web services and connected applications for certain computer operating systems and the Web.

According to one or more embodiments of the present disclosure, a device Web service API can be a set of Web service APIs that allow a server to implement a JIT Bytecode install service. For example, the Web service APIs can be located on a server, which is communicatively coupled to the image processing device via a network 256, such as the Internet (e.g., similar to the arrangement between API and image processing device shown in FIG. 2B).

The Web service APIs can be located on a server, which is communicatively coupled to the image processing device via a network 256, such as the Internet (e.g., similar to the arrangement between API and image processing device shown in FIG. 2B). The image processing device may have a scan/print image API, such as shown in FIG. 2A at 265. During the development of the server client application the scan/image print API can be used by an application developer to create the transformation algorithms for the scanned images or print data into the JIT bytecode.

The install service enables a server client application (i.e., a client application running on the server) to download a JIT bytecode to the imaging processing device (e.g., a multifunction device with imaging and printing functionality). The JIT bytecode download can occur as the image processing device solution (e.g., of an application) is initially configured, on a periodic basis, or on demand, such as when the application requests a dynamic link library (DLL) be installed. The downloaded JIT bytecode can result in the image processing device configuration illustrated by FIG. 2A.

A DLL is a collection of small programs, which can be called upon when needed by an executable program (EXE) that is running. The DLL lets the executable program communicate with a specific device such as a printer or may contain source code to do particular functions. A DLL is an executable file that executes from inside an executable file. To load a DLL file, an executable calls the DLL function along with the required parameters since a DLL may have many different functions in it.

This allows the executable to be smaller in size and not have to write a function that may be used by many executable programs. An advantage of DLL files is that, because they do not get loaded into random access memory (RAM) together with the main program, space is saved in RAM. Therefore, a DLL file can be loaded into Ram only when it is called. For example, a printer DLL file does not need to be loaded into RAM while editing a document in a word processing program until a printing function is initiated. At that time the printer DLL file can be loaded into RAM and a call is made to print.

In some embodiments, the installation process can provide one or more reference tags 231. Reference tags 231 can be used by the server to identify to the device what JIT bytecode to use when processing required. For example, a reference tag 231 may be configured to indicate that a portion of JIT bytecode be used that pertains to image processing of a scanned image, or a reference tag 231 may be configured to indicate that a portion of JIT bytecode be used that pertains to image processing before printing an image.

According to one or more embodiments of the present disclosure, a device Web service API can be a set of Web service APIs that allow a server to implement a JIT bytecode can implement an execution configuration service. A server client application can have a workflow application configured as (e.g., into) an image processing device (e.g., an imaging and printing device). The JIT bytecode implementing the execution configuration service can be implemented so as to identify for that workflow which JIT bytecode to use, or specify a portion of a JIT bytecode to use, in processing of that workflow operation (e.g., scan or print). This can be accomplished, for example, via a reference tag 231 as described above.

The Web service APIs can be located on a server, which is communicatively coupled to the image processing device via a network 256, such as the Interne (e.g., similar to the arrangement between API and image processing device shown in FIG. 2B). The image processing device may have a scan/print image API, such as shown in FIG. 2A at 265. During the development of the server client application the scan/image print API can be used by an application developer to create the transformation algorithms for the scanned images or print data into the JIT bytecode.

The server client application can download the JIT bytecode to the image processing device at an appropriate time via the JIT bytecode install service (as described above). For example, the JIT bytecode may be downloaded to the image processing device during initial install of the application, or during execution of the application. During execution the application can choose based on system load or other performance parameters to either have the image and printing device perform the transformation or the server perform the transformation. This would be accomplished by the application using the JIT bytecode execution configuration service to indicate whether the JIT bytecode is to be configured to be used in a scan and/or print pipeline or not. This can be accomplished by specifying an appropriate reference tag 231.

Alternatively, the application could determine that a specific transformation function is required based on the workflow of the image processing device, and download the appropriate JIT bytecode at that time. This might occur during execution of a workflow. An application interacting with a user at a device can determine that the document that a user is attempting to scan (or print) needs to be transformed using a particular algorithm. The application can cause downloading of a particular JIT bytecode containing the required algorithm and indicate via a reference tag to the image processing device to use the particular JIT bytecode when processing the document. Once the image processing device has been configured to use the JIT bytecode, the image processing device will utilize the OS JIT technology to compile the JIT bytecode into the system in the scan (or print) pipeline during processing of the scanned document (or receipt of the document to print).

As will be appreciated, in this manner the system of the present disclosure does not require embedding a filter into the image processing device. Further, utilization of JIT compilation technologies allows for dynamic installation and execution of image processing filters to facilitate process load balancing (e.g., between image processing device and server), or adaptive processing of workflow based on workflow conditions.

Figure 3:
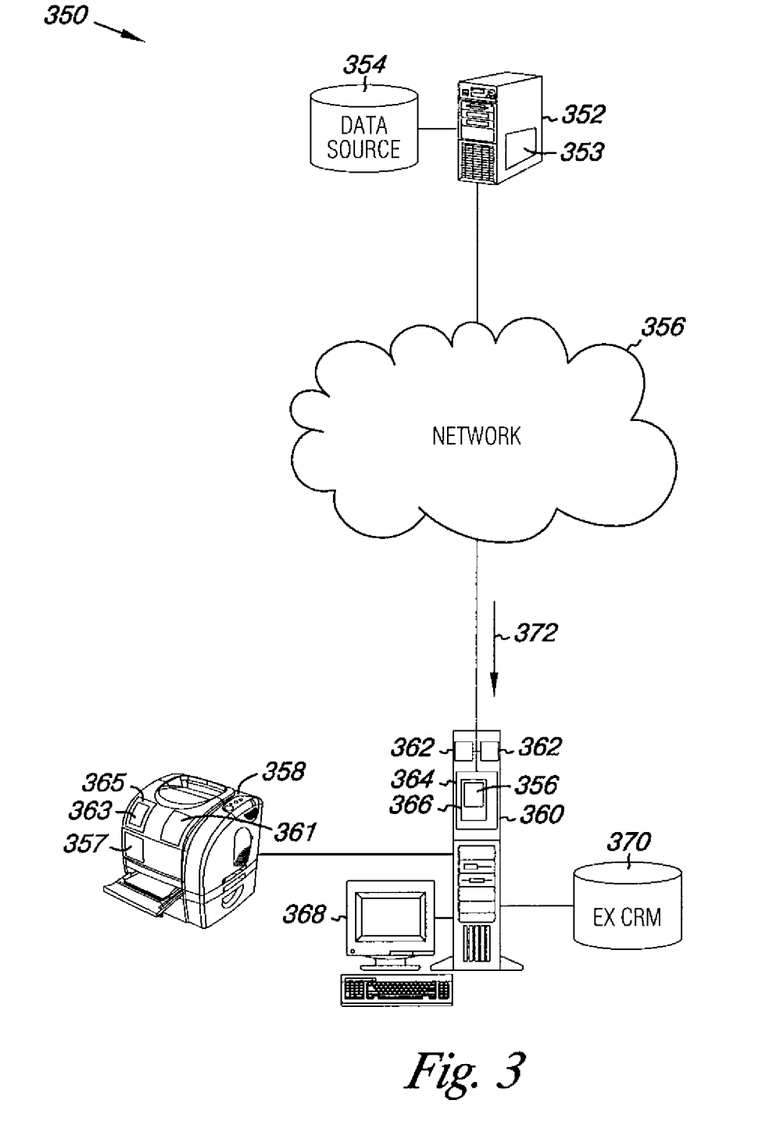
FIG. 3 is a block diagram of a computing system suitable to implement one or more embodiments of the present disclosure.

FIG. 3 illustrates a block diagram of an example of a computing system for dynamically installing image processing according to the present disclosure. The computing system 350 can be comprised of a number of computing resources communicatively coupled to the network 356. FIG. 3 shows a first computing device 352 that may also have an associated data source 354, and may have one or more input/output devices (e.g., keyboard, electronic display). First computing device 352 can include memory 353 in which computer executable instructions implementing a scan/print image API, JIT bytecode install service, and/or JIT bytecode execution configuration service may be stored. For example, first computing device 352 can be a server.

A second computing device 360 is also shown in FIG. 3 being communicatively coupled to the network 356, such that executable instructions 372 may be communicated through the network between the first and second computing devices. Computing device 360 may include one or more processors 362 communicatively coupled to a non-transitory computer-readable medium 364. The non-transitory computer-readable medium 364 may be structured to store executable instructions 366 (e.g., one or more programs) that can be executed by the one or more processors 362 and/or data. The computer executable instructions can, for example, implement a scan/print image API, JIT bytecode install service, and/or JIT bytecode execution configuration service, among other instructions as indicated at 356. The second computing device 360 may be further communicatively coupled to a production device, such as an electronic display 368 and/or image processing device 358 (e.g., multifunction device including scanner and printer). Second computing device 360 can also be communicatively coupled to an external computer-readable memory 370.

Image processing device 358 may include one or more processors 361 communicatively coupled to a non-transitory computer-readable medium 365. Image processing device 358 may include infrastructure 357, such as equipment for scanning and/or printing. The non-transitory computer-readable medium 365 may be structured to store executable instructions 363 (e.g., one or more programs) that can be executed by the one or more processors 361 and/or data. The computer executable instructions can, for example, implement a scan/print image API (e.g., 265 shown in FIG. 2A). The second computing device 360 can cause an output to the production devices 368 and/or 358, for example, as a result of executing instructions of one or more programs stored non-transitory computer-readable medium 364, by the at least one processor 362, to implement a system for dynamically installing image processing according to the present disclosure. Causing an output can include, but is not limited to, displaying text and images to an electronic display and/or printing text and images to a tangible medium (e.g., paper). The second computing device 360 can also receive an input from the production device 368 and/or 358, such keyboard input or a scanned-in image. Executable instructions to dynamically install image processing may be executed by the first 352 and/or second 360 computing device, stored in a database such as may be maintained in external computer-readable memory 370, output to production device 368, and/or printed to a tangible medium.

First 352 and second 360 computing devices are communicatively coupled to one another through the network 356. While the computing system is shown in FIG. 3 as having only two computing devices, the computing system can be comprised of additional multiple interconnected computing devices, such as server devices and/or clients. Each computing device can include control circuitry such as a processor, a state machine, application specific integrated circuit (ASIC), controller, and/or similar machine. As used herein, the indefinite articles "a" and/or "an" can indicate one or more than one of the named object. Thus, for example, "a processor" can include one processor or more than one processor, such as a parallel processing arrangement.

The control circuitry can have a structure that provides a given functionality, and/or execute computer-readable instructions that are stored on a non-transitory computer-readable medium (e.g., 354, 364, 370). The non-transitory computer-readable medium can be integral (e.g., 364), or communicatively coupled (e.g., 354, 370), to the respective computing device (e.g. 352, 360), in either in a wired or wireless manner. For example, the non-transitory computer-readable medium can be an internal memory, a portable memory, a portable disk, or a memory located internal to another computing resource (e.g., enabling the computer-readable instructions to be downloaded over the Internet). The non-transitory computer-readable medium 330 can have computer-readable instructions stored thereon that are executed by the control circuitry (e.g., processor) to provide a particular functionality.

The non-transitory computer-readable medium, as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), among others. The non-transitory computer-readable medium can include optical discs, digital video discs (DVD), high definition digital versatile discs (HD DVD), compact discs (CD), laser discs, and magnetic media such as tape drives, floppy discs, and hard drives, solid state media such as flash memory, EEPROM, phase change random access memory (PCRAM), as well as other types of machine-readable media.

Figure 4:
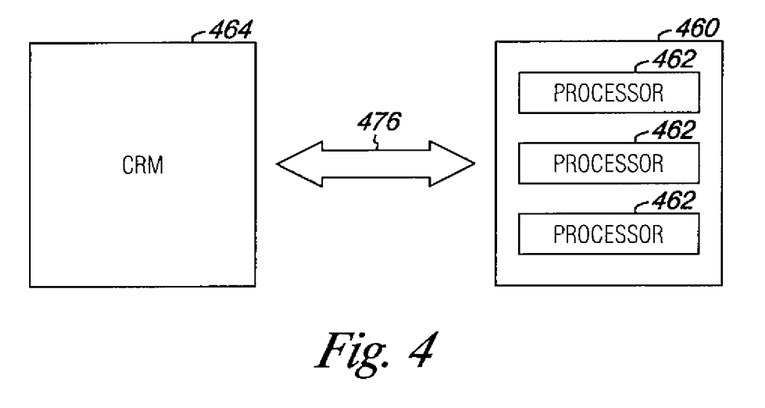
FIG. 4 illustrates a block diagram of an example of a computer readable medium (CRM) in communication with processing resources according to the present disclosure.

FIG. 4 illustrates a block diagram of an example of a computer readable medium (CRM) 464 in communication with processing resources 460 according to the present disclosure. As used herein, processor resources 460 can include one or a plurality of processors 462 such as in a parallel processing arrangement. A computing device having processor resources can be in communication with, and/or receive a tangible non-transitory computer readable medium (CRM) 464 storing a set of computer readable instructions (e.g., software) for capturing and/or replaying network traffic, as described herein.

The non-transitory computer-readable medium can be integral, or communicatively coupled, to a computing device, in either in a wired or wireless manner. For example, the non-transitory computer-readable medium can be an internal memory, a portable memory, a portable disk, or a memory located internal to another computing resource (e.g., enabling the computer-readable instructions to be downloaded over the Internet). The non-transitory computer-readable medium can have computer-readable instructions stored thereon that are executed by the processing resources (e.g., control circuitry, processor(s)) to provide a particular functionality.

The CRM 464 can be in communication with the processor 460 resources via a communication path 476. The communication path 476 can be local or remote to a machine associated with the processor resources 460. Examples of a local communication path 476 can include an electronic bus internal to a machine such as a computer where the CRM 464 is one of volatile, non-volatile, fixed, and/or removable storage medium in communication with the processor resources 460 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

In other examples, the communication path 476 can be such that the CRM 464 is remote from the processor resources 460 such as in the example of a network connection between the CRM 464 and the processor resources 460 (e.g., the communication path 476 can be a network connection). Examples of such a network connection can include a local area network (LAN), a wide area network (WAN), a personal area network (PAN), the Internet, among others. In such examples, the CRM 464 may be associated with a first computing device (e.g., a server) and the processor resources 460 may be associated with a second computing device (e.g., a client). The first and second computers can be in communication via a networked communication path 476.

Figure 5:
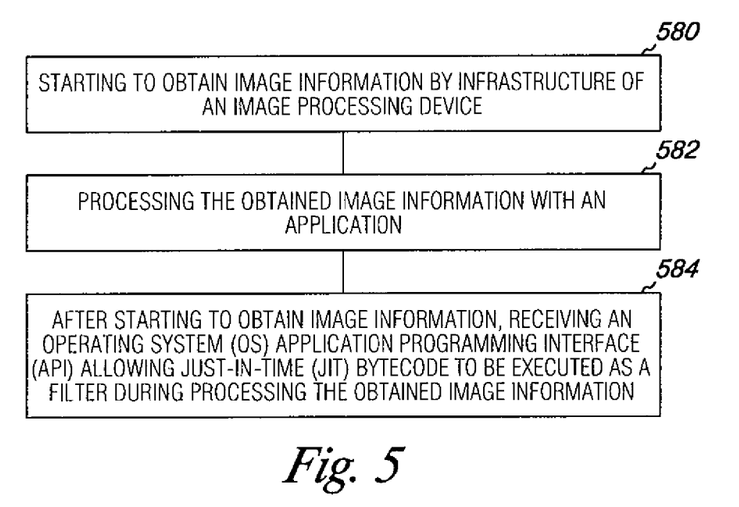
FIG. 5 is a flow chart illustrating an example of a method for dynamically installed image processing according to one or more embodiments of the present disclosure.

FIG. 5 is a flow chart illustrating an example of a method for dynamically installing an image processing filter. One method for dynamically installing an image processing filter includes starting to obtain image information by infrastructure of an image processing device, as indicated at 580. The obtained image information is processed with an application, as shown at 582. After starting to obtain image information, receiving an operating system (OS) application programming interface (API) allowing just-in-time (JIT) bytecode to be executed as a filter during processing the obtained image information, as illustrated at 584.

Although specific examples have been illustrated and described herein, those of ordinary skill in the art will appreciate that an arrangement calculated to achieve the same results can be substituted for the specific examples shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the one or more examples of the present disclosure includes other applications in which the above structures and methods are used. Therefore, the scope of one or more examples of the present disclosure should be determined with reference to the appended claims, along with the full range of equivalents to which such claims are entitled.

In Detailed Description, some features are grouped together in a single embodiment for the purpose of streamlining the disclosure. This method of disclosure is not to be interpreted as reflecting an intention that the disclosed examples of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A network-connected server comprising:
   one or more processors; and
   one or more memory resources storing instructions for facilitating image processing by an image processing device, wherein the instructions, when executed by the one or more processors, cause the server to:
   receive image data from the image processing device, wherein a reference tag is included in the image data, the reference tag indicating specified just-in-time (JIT) bytecode required to complete processing of a print job or a scan job;
   using the reference tag, locate the specified JIT bytecode in the one or more memory resources;
   using the specified JIT bytecode, transform the image data to enable the image processing device to execute the print job or the scan job at runtime; and
   send the transformed image data to the image processing device for execution of the print job or the scan job.

2. A method for image processing, the method being performed by one or more processors of an image processing device connected to a network and comprising:
   receiving, from a computing device, image data corresponding to a scan job or a print job of an image;
   initiating processing of the image data using an application of the image processing device;
   determining that the image data requires transformation to complete processing using the application;
   providing a reference tag in the image data to enable a server, connected to the image processing device via the network, to identify specified just-in-time (JIT) bytecode required to complete processing of the image data;
   executing the specified JIT bytecode at runtime to transform the image data to be processed by the application; and
   while executing the specified JIT bytecode, processing the image data using the specified JIT bytecode and the application.

3. The method of claim 1, wherein determining that the image data requires transformation to complete processing is based on determining that the image processing device requires a particular transformation technique to transform the image data to complete processing.

4. The method of claim 3, further comprising:
   in response to determining that the image data requires transformation to complete processing, communicating with the server, connected to the image processing device via the network, to receive source code corresponding to the particular transformation technique to complete processing of the image data.

5. The method of claim 4, further comprising:
   dynamically translating the source code into the specified JIT bytecode while processing the image data and executing the specified JIT bytecode at runtime.

6. The method of claim 5, wherein dynamically translating the source code into the specified JIT bytecode is performed by a dynamic translator included with the image processing device.

7. The method of claim 1, further comprising:
   executing the processed image data to complete the scan job or the print job.

8. The method of claim 1, further comprising:
   communicating with the server to receive the specified JIT bytecode for runtime execution.

9. The method of claim 1, wherein the image data includes image metadata corresponding to one or more of a format, a size, or a number of pages of the image.

10. The method of claim 9, wherein determining that the image data requires transformation to complete processing includes determining that the image metadata requires transformation, the method further comprising:
    executing the specified JIT bytecode to transform the image metadata to complete processing of the image data at runtime; and
    executing the processed image data for scanning or printing.

11. A non-transitory computer-readable medium storing instructions that, when executed by one or more processors of an image processing device connected to a network, cause the image processing device to:
- receive, from a computing device, image data corresponding to a scan job or a print job of an image;
- initiate processing of the image data using an application of the image processing device;
- determine that the image data requires transformation to complete processing using the application;
- provide a reference tag in the image data to enable a server, connected to the image processing device via the network, to identify specified just-in-time (JIT) bytecode required to complete processing of the image data;
- execute the specified JIT bytecode at runtime to transform the image data to be processed by the application; and
- while executing the specified JIT bytecode, process the image data using the specified JIT bytecode and the application.

12. The non-transitory computer-readable medium of claim 11, wherein determining that the image data requires transformation to complete processing is based on determining that the image processing device requires a particular transformation technique to transform the image data to complete processing, and wherein the executed instructions further cause the image processing device to:
- in response to determining that the image data requires transformation to complete processing, communicate with the server, connected to the image processing device via the network, to receive source code corresponding to the particular transformation technique to complete processing of the image data.

13. The non-transitory computer-readable medium of claim 12, wherein the executed instructions further cause the image processing device to:
- dynamically translate the source code into the specified JIT bytecode while processing the image data and executing the specified JIT bytecode at runtime.

* * * * *